United States Patent
Mokkapati et al.

(10) Patent No.: US 10,630,568 B2
(45) Date of Patent: Apr. 21, 2020

(54) TRANSMISSION CONTROL PROTOCOL TIMESTAMP REWRITING

(71) Applicant: QUALCOMM Incorporated, San Diego, CA (US)

(72) Inventors: Venu Madhav Mokkapati, Hyderabad (IN); Gurudutt Narasimha, San Diego, CA (US); Uday Kumar Arava, Hyderabad (IN); Madhu Yashwanth Boenapalli, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 22 days.

(21) Appl. No.: 16/124,507

(22) Filed: Sep. 7, 2018

(65) Prior Publication Data

US 2020/0084130 A1    Mar. 12, 2020

(51) Int. Cl.

| | |
|---|---|
| H04L 12/28 | (2006.01) |
| H04L 12/26 | (2006.01) |
| H04W 76/10 | (2018.01) |
| H04L 29/08 | (2006.01) |
| H04L 5/00 | (2006.01) |

(52) U.S. Cl.
CPC .......... *H04L 43/106* (2013.01); *H04L 5/0055* (2013.01); *H04L 43/08* (2013.01); *H04L 69/326* (2013.01); *H04W 76/10* (2018.02)

(58) Field of Classification Search
USPC ....... 370/254, 259, 260, 270, 276, 278, 282, 370/373
See application file for complete search history.

(56) References Cited

U.S. PATENT DOCUMENTS

| | | | |
|---|---|---|---|
| 2009/0323530 A1* | 12/2009 | Trigui | H04L 41/5025 370/235 |
| 2010/0306249 A1* | 12/2010 | Hill | G06Q 30/02 707/769 |
| 2013/0170358 A1 | 7/2013 | Chen et al. | |
| 2016/0191632 A1 | 6/2016 | Mirsky et al. | |
| 2017/0149935 A1* | 5/2017 | van Bemmel | H04L 67/1023 |
| 2017/0310569 A1 | 10/2017 | Clemm et al. | |
| 2018/0041415 A1 | 2/2018 | Nitinawarat et al. | |

FOREIGN PATENT DOCUMENTS

| | | |
|---|---|---|
| CN | 104320809 A | 1/2015 |
| CN | 106685930 A | 5/2017 |

* cited by examiner

*Primary Examiner* — Phuongchau Ba Nguyen
(74) *Attorney, Agent, or Firm* — Loza & Loza, LLP

(57) ABSTRACT

Systems, methods, and apparatus for rewriting or adjusting a TCP timestamp value are described. The methodology includes determining network conditions of a wireless network, and establishing a transmission control protocol (TCP) connection between a first communication device and a second communication device via the wireless network. The timestamp value within a TCP packet to be transmitted, such as as a TCP SYN ACK packet in a 3-way handshake, is adjusted with the use of a timestamp adjusting circuitry or hardware, where the adjustment is based on the determined network conditions. By adjusting the timestamp of a TCP packet prior to transmission and based on network conditions, unnecessary retransmissions are reduced. Additionally, the use of timestamp adjusting hardware allows for more efficient timestamp adjustment by offloading processor computations.

27 Claims, 8 Drawing Sheets

TRANSMISSION CONTROL PROTOCOL TIMESTAMP REWRITING

TECHNICAL FIELD

The present disclosure relates generally to Transmission Control Protocol (TCP) in communication networks, and more specifically to rewriting or adjusting TCP timestamps based on network conditions.

INTRODUCTION

Wireless communication networks are widely deployed to provide various types of communication content such as voice, video, data, messaging, broadcast, and so on. With respect to wireless data transmissions, in particular, TCP (Transmission Control Protocol) is frequently used to define how software applications establish and maintain a network connection to exchange data between two network entities (e.g., a server and a client). TCP is a transport layer protocol typically used by applications to establish a full duplex channel between the two entities. Typically, TCP is used by applications that require guaranteed delivery. Since TCP is connection-oriented where the connection is established and maintained until the software applications at each end of the connection have completed exchanging data. In particular, TCP breaks application data into TCP packets for communication over the network, acknowledges packets that are properly received via the network, and requests retransmission of packets that are not received or contain errors.

Since TCP seeks to keep the channel active, it is necessarily time sensitive. Newer platforms and TCP versions support a feature where both the entities (e.g., server and client) broadcast their clock times in milliseconds as part of a 3-Way handshake (See e.g., Internet Engineering Task Force (IETF) RFC 1323). TCP sets a timeout value of a time within which TCP packets transmitted by a transmitter to a receiver should be acknowledged by the receiver. If a timer expires prior to receiving the acknowledgement, the transmitter has to retransmit the TCP packet. In some instances, however, the failure to acknowledge may result in TCP retransmissions that are redundant for TCP packets that have been correctly received, with such retransmissions resulting in a reduction of network throughput.

TCP retransmission timeouts due to bad network conditions or radio impairment events, as examples, may cause excessive throughput loss and unneeded retransmissions of data. To compensate, a communication device may adjust a timestamp value in a TCP packet to cause an increase in the retransmission timeout value calculated by a server device. A larger timeout value based on the increased timestamp value may reduce the likelihood of a TCP connection timing out and prevent a server from retransmitting a TCP packet to a client communication device, which may have already correctly received the TCP packet. In another example, the communication device may delay sending an acknowledgment (ACK) TCP packet to engender an increase in the retransmission timeout value calculated by the server device. A need exists, however, to more efficiently adjust or rewrite the timestamp value in communication devices.

SUMMARY

Certain aspects of the disclosure relate to systems, apparatus, methods, and techniques that afford rewriting of TCP timestamps based on network conditions.

According to an aspect, a method is disclosed for wireless network communication. The method includes determining network conditions of at least a wireless network. Additionally, the method includes establishing a transmission control protocol (TCP) connection between a first communication device and a second communication device via at least the wireless network. Finally, the method includes adjusting a timestamp value in a TCP packet to be transmitted using a timestamp adjusting circuitry, the adjusting based at least in part on the determined network conditions.

According to another aspect, an apparatus for wireless communication is disclosed. The apparatus includes means for determining network conditions of at least a wireless network. Additionally, the apparatus includes means for establishing a transmission control protocol (TCP) connection between a first communication device and a second communication device via at least the wireless network. Further, the apparatus includes means for adjusting a timestamp value in a TCP packet transmitted based at least in part on the determined network conditions, where the means for adjusting the timestamp value includes a dedicated timestamp adjusting circuitry.

In yet another aspect, an apparatus for wireless communication in a wireless communication device is disclosed. The apparatus includes a processing circuitry and memory in communication with the processor. Instructions are stored in the memory and operable, when executed by the processing circuitry, to cause the apparatus to determine network conditions of at least a wireless network, and establish a transmission control protocol (TCP) connection between the communication device and another communication device via at least the wireless network. Additionally, the instructions stored in the memory are operable to cause the apparatus to adjust a timestamp value in a TCP packet to be transmitted based at least in part on the determined network conditions with the use of a dedicated time adjustment circuitry or hardware.

According to yet another aspect, a non-transitory computer-readable medium storing computer-executable code is disclosed. The medium comprises code for causing a computer to determine network conditions of at least a wireless network, and establish a transmission control protocol (TCP) connection between a first communication device and a second communication device via at least the wireless network. Furthermore, the medium includes code for causing a computer to adjust a timestamp value in a TCP packet to be transmitted based at least in part on the determined network conditions with the use of a dedicated time adjustment circuitry or hardware.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. It will be apparent to those skilled in the art, however, that these concepts may be practiced without these specific details. In some instances, well-known structures and components are shown in block diagram form in order to avoid obscuring such concepts.

Several aspects of the present methods and apparatus will be presented in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware, software, or firmware depends upon the particular application and design constraints imposed on the overall system.

Whenever a client or server sends a TCP packet, the sending client or server waits for a pre-calculated time duration (termed the "Round Trip Time" (RTT)) for an acknowledgement (ACK) from the other party. Whenever the timer measuring or tolling the RTT times out, the sending device then typically retransmits the packet with an increased RTT. As mentioned above, in TCP the retransmission timeouts of the RTT due to poor network conditions or radio impairment events may cause excessive throughput loss and unneeded retransmissions of data. Examples of such conditions may include conditions or events such as handovers with Inter Radio Access Technology (IRAT), Out Of Service (OOS) events when a phone goes to an out-of-coverage area, or when a network is congested. Such conditions may prevent a communication device from timely acknowledging a correctly received TCP packet, for example. Failure to acknowledge a packet in a timely manner will typically result in a TCP retransmission timeout and a redundant retransmission of an already received TCP packet. A solution to reducing retransmissions may include adjusting or rewriting a timestamp in fields of a TCP packet responsive to the poor network conditions or impairments. When the timestamp is adjusted, a client or server device sending the TCP packet may then wait longer before indicating a timeout condition for retransmission, which reduces unnecessary retransmissions.

Figure 1:
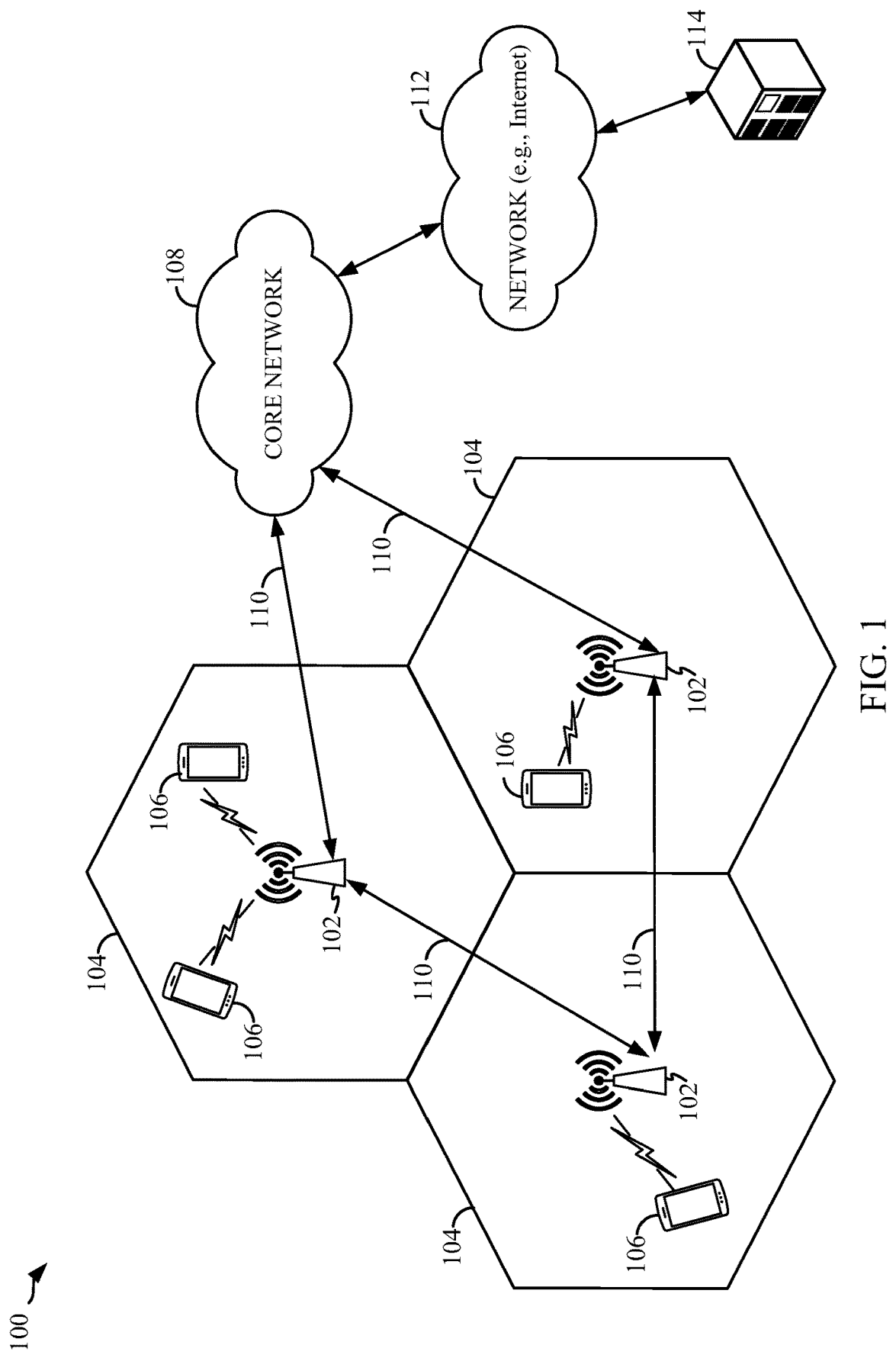
FIG. 1 illustrates an example of a system for wireless communication that supports TCP timestamp rewriting in accordance with aspects of the present disclosure.

FIG. 1 illustrates an example of a wireless communications system 100 within which various aspects of the present methods and apparatus are deployable. The wireless communications system 100 includes base stations, access points (APs), or eNodeBs (eNBs) 102 that engender respective network cells or areas 104, various wireless communication devices 106, and a core network 108, where the core network 108 may include backhaul links 110 between base stations 102 or from the base stations 102. In some examples, the wireless communications system 100 may be an LTE (or LTE-Advanced) network, but the present disclosure is not limited to such, and may be applied to other communication technologies such as 5G or new radio (NR) systems, for example.

Base stations 102 may wirelessly communicate with communication devices 106 via one or more base station antennas. Communication links shown in wireless communications system 100 may include uplink (UL) transmissions from a communication device 106 to a base station 102, or downlink (DL) transmissions, from a base station 102 to a communication device 106. Communication devices 106 may be dispersed throughout the wireless communications system 100 (and more specifically a Radio Access Network (RAN) and cells 104 thereof), and each communication device 106 may be stationary or mobile. The communication devices 106 may also be referred to as a mobile station (MS), user equipment (UE), subscriber station, remote unit, wireless device, access terminal (AT), handset, a user agent, client, cellular phone, handheld device, personal computer, tablet, personal electronic device, or similar terminology.

In further aspects, base stations 102 may communicate with the core network 108 as well as with one another, where the base stations 102 communicate to each other (e.g., X2 interfaces) or the core network 108 (e.g., S1 interfaces) through backhaul links 110, as an example. Base stations 102 may also perform radio configuration and scheduling for communication with communication devices 106, or may operate under the control of a base station controller (not shown). In a further example, the portions of backhaul 110 coupling the base stations 102 and, more generally, coupling a Radio Access Network (RAN) implemented thereby to the core network 108 may be implemented by an LTE S1 interface, for example, where the core network 108 may be an evolved packet core (EPC). In particular, the S1 interfaces are used to communicatively coupled the base stations 102 to at least one Mobility Management Entities (MME) (not shown) in the core network 108, as well as at least one serving gateway (S-GW) (not shown), which serves to route and forward user data packets. For data packets, the core network 108 may also include one or more PDN gateways (P-GW) (not shown) coupled to the S-GW, which provides connectivity from the communication devices 106 to external packet data networks, including network 112, for example.

Transmission Control Protocol (TCP) may be used to provide the reliable, ordered, and error-checked delivery of a stream of data between a communication device 106 and a remote host or server 114 via network 112 and core network 108. TCP may also support a connection between other devices, such as between two different communication devices, or any device supporting a TCP stack.

As alluded to above, TCP may impose relatively stringent requirements for TCP segment error rates, and the impact thereof may become significant as data rates rise. To achieve desired TCP segment error rates, packets may need to be retransmitted one or more times. In bad network conditions, for example, a TCP connection may time out if an acknowledgment from one communication device to another (e.g., between a client and a server) within the predefined amount of time (e.g., timeout) after receipt of a TCP packet. As also mentioned before, communication devices (e.g., 106) may be configured to rewrite timestamps in TCP packets or may delay sending TCP acknowledgement packets, or both, to reduce the likelihood that a TCP connection times out during bad network conditions or radio impairment events. In particular, the present method and apparatus provide for timestamp rewriting with increased efficiency as through the use of additional hardware and filtering in communication devices, as will be discussed below.

Figure 2:
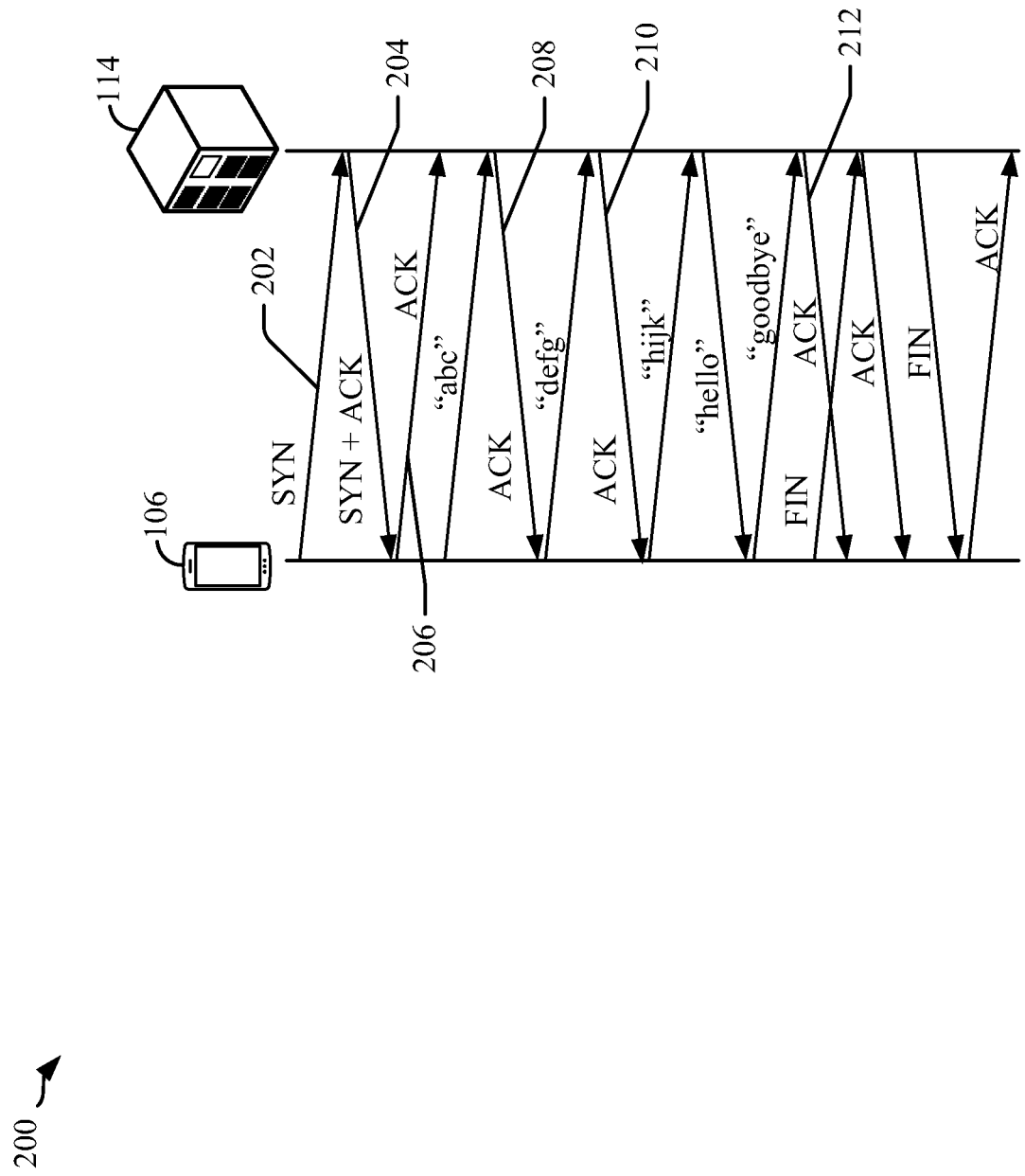
FIG. 2 illustrates an exemplary flow diagram of a typical TCP session and the particular messaging sequences between two devices communicating and the timing thereof.

Before discussing the presently methodologies and apparatus, FIG. 2 illustrates a flow diagram 200 of a typical TCP session and the particular messaging sequences between two devices communicating with other, such as between a client and a server, and the timing thereof. It is noted that for purposes of this disclosure, the communicating entities are merely exemplary, and the present methods and apparatus are employable in both client and server devices, for example, or more generally, in either of any two devices communicating using TCP (e.g., device A and device B). In the illustrated example, a communication device 106 and a server or remote host 114 are shown establishing a TCP connection, communicating various data, and then finishing or terminating the TCP connection.

The first three transmitted messages or packets 202, 204, and 206, in particular, constitute a three-way TCP handshake used to establish a full duplex TCP connection between two communication devices, such as a client communication device 106 (e.g., a UE) and a server 114. Specifically, the TCP handshake utilizes a synchronization (SYN) packet 202, a synchronize acknowledgement (SYN+ACK, also written as "SYN-ACK") packet 204, and a final acknowledgement (ACK) packet 206. As shown in the example of FIG. 2, the communication device 106 transmits the SYN packet 202 to the server 114. Once packet 202 is received at the server 114, the server transmits the SYN+ACK packet 204 to the communication device 106, acknowledging the SYN packet. The SYN+ACK packet 204 has an acknowledgment number set to one more than a received sequence number of the SYN packet 202 and a sequence number that is another random number the server 114 selects for the SYN+ACK packet 204. Once the SYN+ACK packet 204 is received by the communication device 106, the device 106 sends ACK packet 206 to the server 114. The ACK packet 206 includes a sequence number set to one more than the received acknowledgement value and the acknowledgement number set to one more than the received sequence number. After the three-way handshake is complete, a TCP connection is established between the communication device 106 and the server 114. Once the TCP connection is established, various data is sent between two devices, after which the TCP connection is closed (e.g., by transmission of FIN packets), such as when no further data is to be sent.

As discussed before, TCP protocol specifies that a communicating device retransmit TCP packets that have not been acknowledged within the retransmission timeout period. In the example of FIG. 2, either of devices 106 or 114 may maintain a TCP clock and various TCP parameters for determining when a retransmission timeout occurs. The TCP clock may indicate a current time associated with the TCP connection. TCP parameters may include a retransmission time out (RTO) parameter, a round trip time (RTT) parameter used in a round trip time measurement (RTTM) mechanism or process, a smoothed round trip time (SRTT) parameter, and a round trip time variation (rttvar) parameter, as examples. Either of the communication device 106 or the server 114 may be configured to generate various TCP parameters including parameters based at least in part on timestamp values included in header portions of TCP packets communicated between these two devices.

Figure 3:
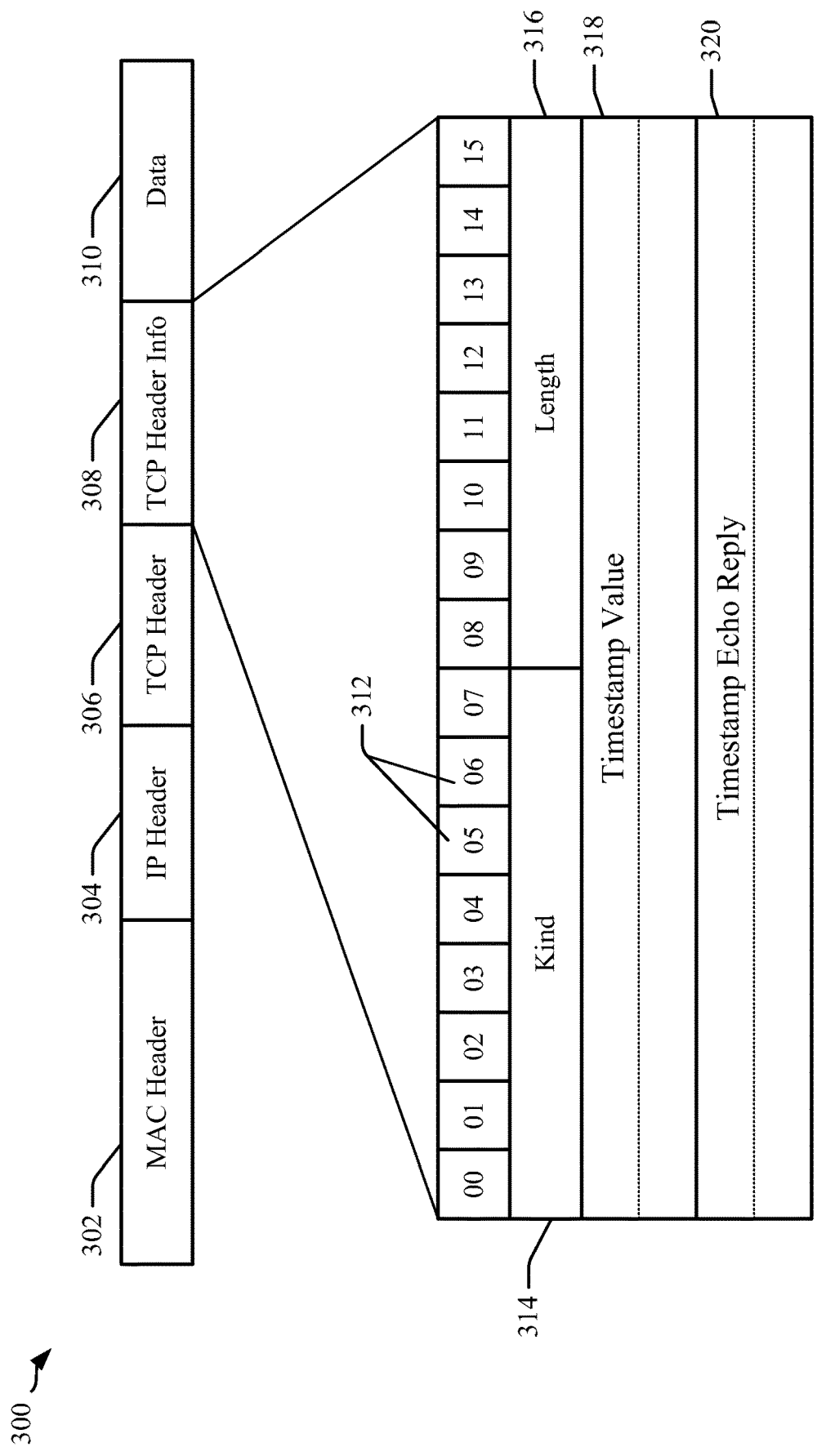
FIG. 3 shows an exemplary format for a TCP packet structure having a timestamp value in a header of the TCP packet.

As an example of the structure of TCP packets and, in particular, those types of TCP packets including timestamp values in a header, FIG. 3 shows an exemplary format for a TCP packet 300. In particular, the format of the TCP packet 300 includes a MAC header 302 with media access control addressing, an IP header 304 with IP address information, a TCP header 306, other TCP header information 308, and the packet data 310. In aspects, the different headers and header information in elements 302, 304, 306, and 308 may collectively be referred to as the TCP header of the TCP packet 300. Concerning the illustrated TCP header information 308, in particular, this element may include the timestamp information that may be used for RTTM, for example.

As further illustrated in FIG. 3, TCP header information 308 may be structured in rows of 16 bits (i.e., 00-15 as shown for example at 312). In this example, the header information 308 may include the kind of TCP packet in 8 bit field 314, and an 8 bit length of TCP packet field. In a next two rows, the timestamp value (TSval) is embedded in two 16 bit rows for a total of 32 bits for timestamp field 318. This field 318 contains the current value of the timestamp clock for the TCP packet. In some aspects, the header information 308 may include a Timestamp Echo Reply (TSecr) filed 320, which is also a 32 bit field matching the size of timestamp field 318. It is noted that field 320 may be configured to only be valid if an ACK bit is set in the TCP header. If this field 320 is valid, this information echoes the timestamp value that was sent by a remote TCP entity in the TSval field 318. When the TSecr field 320 is not valid, the value of this field is set to zero. Furthermore, the TSecr value will generally be from the most recent timestamp that was received, although in other aspects the TCP entity may send the timestamp option in an initial SYN segment (i.e., a segment containing a SYN bit and no ACK bit).

Figure 4:
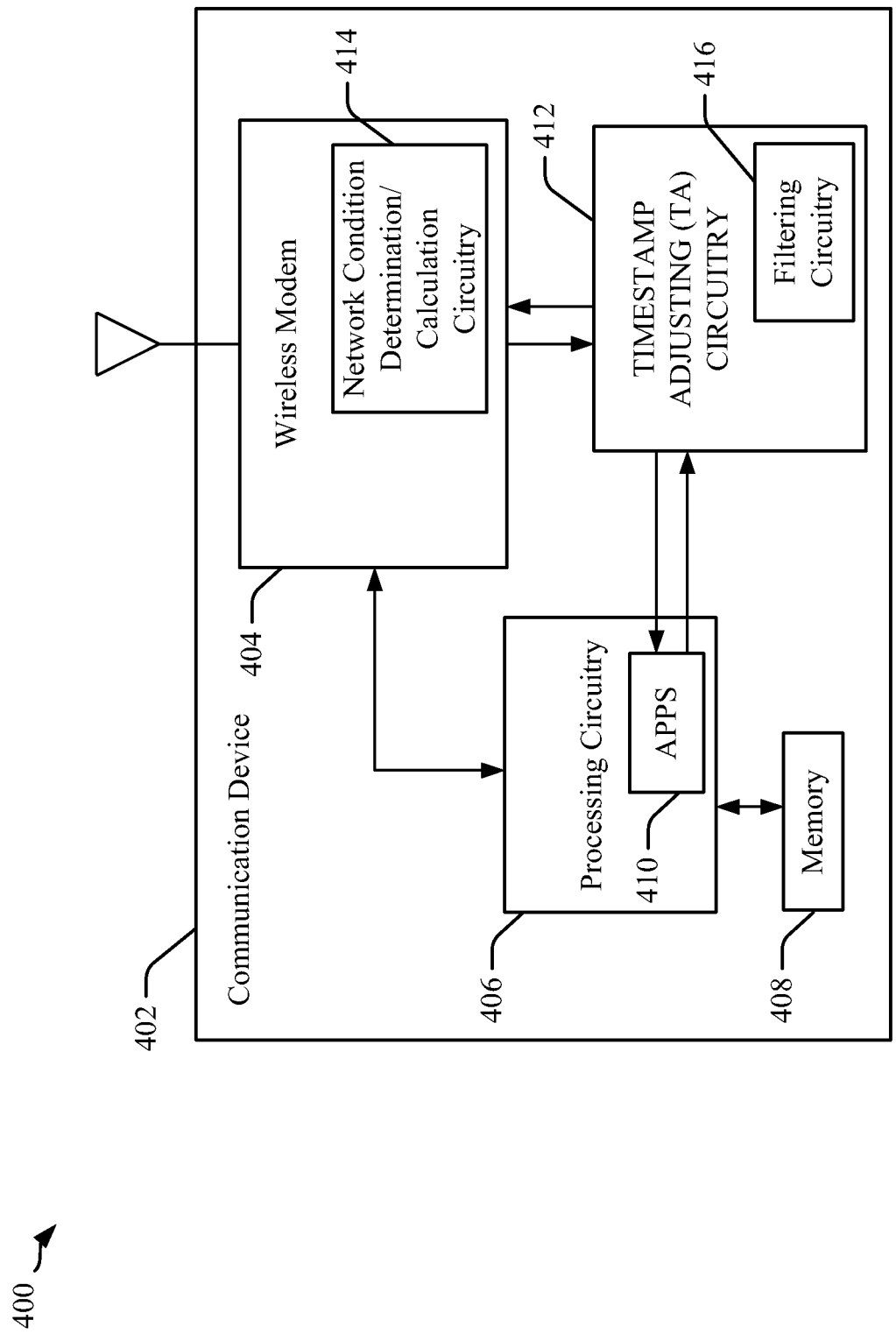
FIG. 4 illustrates a block diagram of a communication apparatus employing circuitry for implementing certain aspects of the presently disclosure.

FIG. 4 illustrates an exemplary communication system 400 that may implement certain aspects of the presently disclosed methods and apparatus. System 400 includes a communication device 402, which may be implemented by either communication device 106 or server 114, as two examples, but not limited to such. In the example of FIG. 4, communication device 402 may be a wireless communication device including a wireless modem 404 configured to effectuate wireless communications with network elements, such as a base station (e.g., base station 102) according to one or more various radio access technologies in respective radio access networks, include TCP data communications. A processing circuitry 406 is communicatively coupled to the modem 404 for exchanging transmission and received information and data. Coupled with circuitry 406 is a memory or storage device 408 storing particular code for causing the processing circuitry 406 to implement various function and applications. In the illustrated example, a functional block 410 illustrating particular applications (APPS) running on the processing circuitry is shown to illustrate the further features of the present disclosure as will be discussed below.

In the particular example of FIG. 4, the communication device 402 may further include a timestamp adjustment hardware (HW), circuitry, or logic 412 that is communicatively coupled to the APPS 410. The purpose of timestamp adjustment circuitry 412 is for rewriting or adjusting a timestamp value for TCP packets including a timestamp, such as SYN+ACK or ACK packets, but not necessarily limited to such. The adjustment of the timestamp value may be based on a time difference or time delta (Δ) value that is determined externally, such as by modem 404, based on network conditions. For example, lower layers, such as LTE/W layer, have mechanisms to determine an additional delta time (e.g., stretch values or, as termed herein more generally, a "timestamp adjustment parameter") that a TCP packet might require to reach to its destination in network conditions such as handovers in Inter Radio Access Technology, Out Of Service condition when a device goes to an out of coverage area, or when the network is congested. In an aspect, such mechanisms may be embodied as a network condition calculation/determination circuitry 414 within the modem 404, which determines the delta time value or timestamp adjustment parameter based on various network conditions affecting the time that a TCP packet will reach its destination. In other aspects, the modem 404 and circuitry 414 may be configured to pass the delta time value or timestamp adjustment parameter to the timestamp adjusting circuitry or hardware 412 with a driver code, in one example. Accordingly, in operation when a TCP packet is to be sent from the APPS 410, the packet is routed to the modem 404 via the timestamp adjusting circuitry or hardware 412 where the timestamp is adjusted or rewritten based on the timestamp adjustment parameter or delta. In an example, the timestamp adjusting circuitry or hardware 412 may serve to add or subtract the timestamp adjustment parameter or delta, which constitutes a time dimension, from or to the timestamp value in the TCP packet.

In further aspects, the timestamp adjusting circuitry or hardware 412 may be configured with filtering logic or circuitry 416 that effectuate filtering rules to distinguish whether an uplink TCP packet from the APPS 410 is a particular type of TCP packet, such as a TCP ACK packet with the timestamp headers, for example. Accordingly, only those TCP packets meeting the filtering rules as determined by filtering logic or circuitry 416 will be acted upon for adjustment or rewriting of the timestamp. In a further aspect, it is noted that either the timestamp adjusting circuitry or hardware 412 or the modem 404 may recalculate a new checksum based on the updated field. Of note, the checksum is used to validate that the TCP header has not been corrupted or altered. Thus, since the TCP timestamp is updated, the checksum is recalculated to communicate that the TCP header change is not the result of some corruption or alteration, but due to an intended operation; namely the TCP timestamp update.

Of further note, the timestamp adjustment circuitry 412 may be configured to perform adjustment of the timestamp value upon each new TCP session or connection, provided that the network condition calculation/determination circuitry 414 provides the timestamp adjustment parameter or delta or a value greater than zero. That is, when the network conditions are good and not impaired, the network condition calculation/determination circuitry 414 may set the timestamp adjustment parameter or delta to a value of zero as no timestamp adjustment is warranted in such case. Thus, either timestamp adjustment circuitry 412 can be configured to simply add zero, which will result in an unaffected timestamp, or the timestamp adjustment circuitry 412 may be configured to not perform any processing or addition when a zero value adjustment parameter or delta is received from the network condition calculation/determination circuitry 414. Of yet further note, it follows that whenever the network attains normalcy, the timestamp adjustment parameter or delta is reset or returns to zero such that the TCP packets, such as TCP ACK packets, are sent as is. In still another aspect, the timestamp adjustment circuitry 412 may effectuate offloading or a more efficient adjustment of timestamps adjusting or rewriting from the modem 404, as one example, which would results in a savings of instructions and power usage of the modem 404. It is noted that the timestamp adjustment circuitry 412 may be implemented with logic circuitry, an ASIC, FPGAs, or similar devices.

Figure 5:
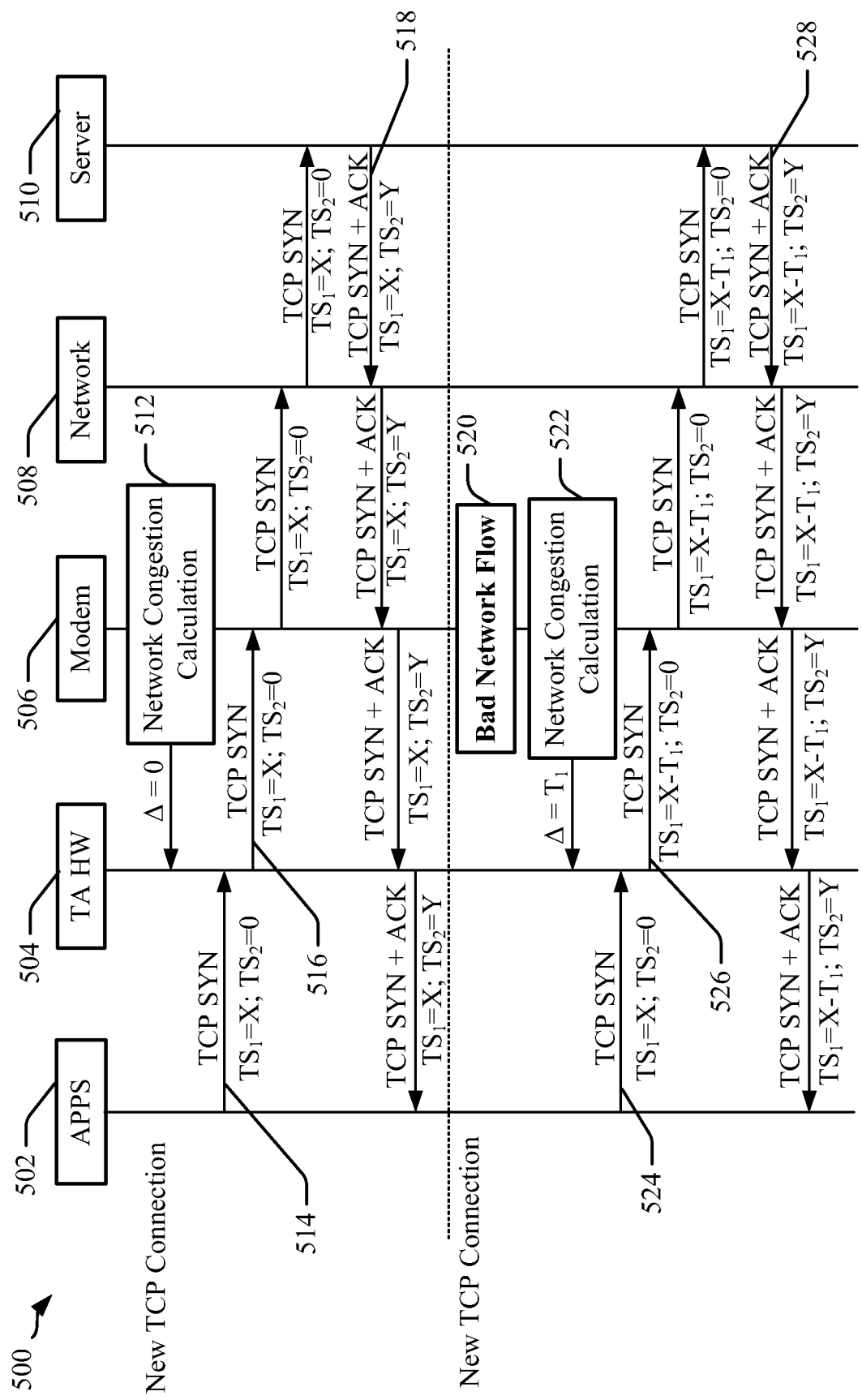
FIG. 5 illustrates an exemplary process flow diagram of TCP packet flow in a network in accordance with certain aspects disclosed herein.

As a further illustration of an exemplary operation of the system 400, FIG. 5 illustrates a process flow diagram 500 showing the messages passed between the various entities during TCP sessions or connections and the relative timing thereof. As may be seen in the figure, the entities include the APPS 502, which are executed in a processing circuitry in a communication device, timestamp adjustment hardware or circuitry 504, which also may reside in the communication device, a modem 506 resident in the communication device, and a network 508, which may include one or more of a wireless network, a core network for a radio access network (RAN), and a computer network, such as the internet. Further, the entities involved also include a server or remote host 510, with which the communication device is communicating with via the TCP connection.

As may be seen at block 512, a network condition or congestion calculation is performed in the modem 506, such as by the Network Condition Determination/Calculation Circuitry 414 in the example of FIG. 4. In the instance at block 512, no congestion or impairment is assumed to have been determined, and thus the timestamp adjustment or delta value is zero. This information is passed from the modem 506 to the timestamp adjustment hardware or circuitry 504. Since, in this instance, the value is zero, when a TCP SYN message 512 is passed from the APP 502 to the timestamp adjustment circuitry 504, for example, the time stamp value $TS_1$ remains unchanged (e.g., $TS_1=X$) as may be seen at message 516. After the TCP SYN message is propagated via the modem 506 and network 508 to the remote host or server 510, the server 510 acknowledges receipt with a TCP SYN+ACK message with an added second timestamp value $TS_2$ as shown at 518, for example, which is used to indicate the current time of the server that is responding to the message. The TCP SYN+ACK message is then propagated back to the APP 502 via the network 508 and the modem 506.

A next illustrated example in FIG. 5 of a new TCP connection assumes that bad network conditions are occurring at a time before or at the initiation of the new TCP session as shown at block 520, where the bad conditions affect the transmission times of the TCP packets. In such case, modem 506 determines that poor network conditions are extant and calculates a timestamp adjustment parameter or time delta value $T_1$ as shown at block 522. The modem 506 passes the timestamp adjustment parameter or time delta value to the timestamp adjusting hardware 504, which will use the value to adjust or rewrite the timestamp value of an appropriate TCP packet. In the illustrated example, when a TCP SYN packet is generated by APP 502, the timestamp value $TS_1$ of the packet is set to some value "X" as shown at reference number 524. As described in the system 400 of FIG. 4, TCP packets are passed through the timestamp adjustment hardware or circuitry 504 (412 in FIG. 4), rather than directly to the modem 506. In this case, if the filter (e.g., filtering circuitry 416) in the timestamp adjustment hardware or circuitry 504 determines that the TCP packet is the type of packet that includes a timestamp value to be adjusted, the hardware 504 will adjust or rewrite the timestamp value. In the illustrated example, the adjusted timestamp $TS_1$ is then set to or rewritten as $TS_1=X-T_1$ as may be seen at reference number 526. After adjustment of the timestamp value for the packet, the packet is propagated to the server 510 via the modem 506 and the network 508. After the TCP SYN message is propagated via the modem 506 and network 508 to the remote host or server 510, the server 510 acknowledges receipt with a TCP SYN+ACK message with an added second timestamp value $TS_2$ as shown at 528, for example, which is propagated back to the APPS 502.

It is noted that FIG. 5 illustrates that a communication device, such as device 106 and APPS 502 in particular, will generate a TCP packet having a timestamp value (e.g., $TS_1$) based at least in part on the current time of the TCP clock within the communication device. When the receiving entity (e.g., server 510) receives the TCP packet, this receiving entity generates and transmits an acknowledgment packet that includes the received timestamp value (e.g., $TS_1$) in the timestamp echo reply field (e.g., TSER field 320 shown in FIG. 3) along with the receipt timestamp at the receiving device (e.g., $TS_2$). When the APPS 502 receive the acknowledgment packet, the APPS 502 will calculate a value for the RTT parameter as a function of the current time of the TCP clock and the value in the TSER field. Thus, the RTT parameter may be calculated based on the following equation:

RTT=current time−$TS_1$ in TSER field

In the present system, however, when network conditions are determined to be bad and the timestamp is rewritten or adjusted, the value of the RTT parameter will be increased because the RTT=current time−X−$T_1$.

Figure 6:
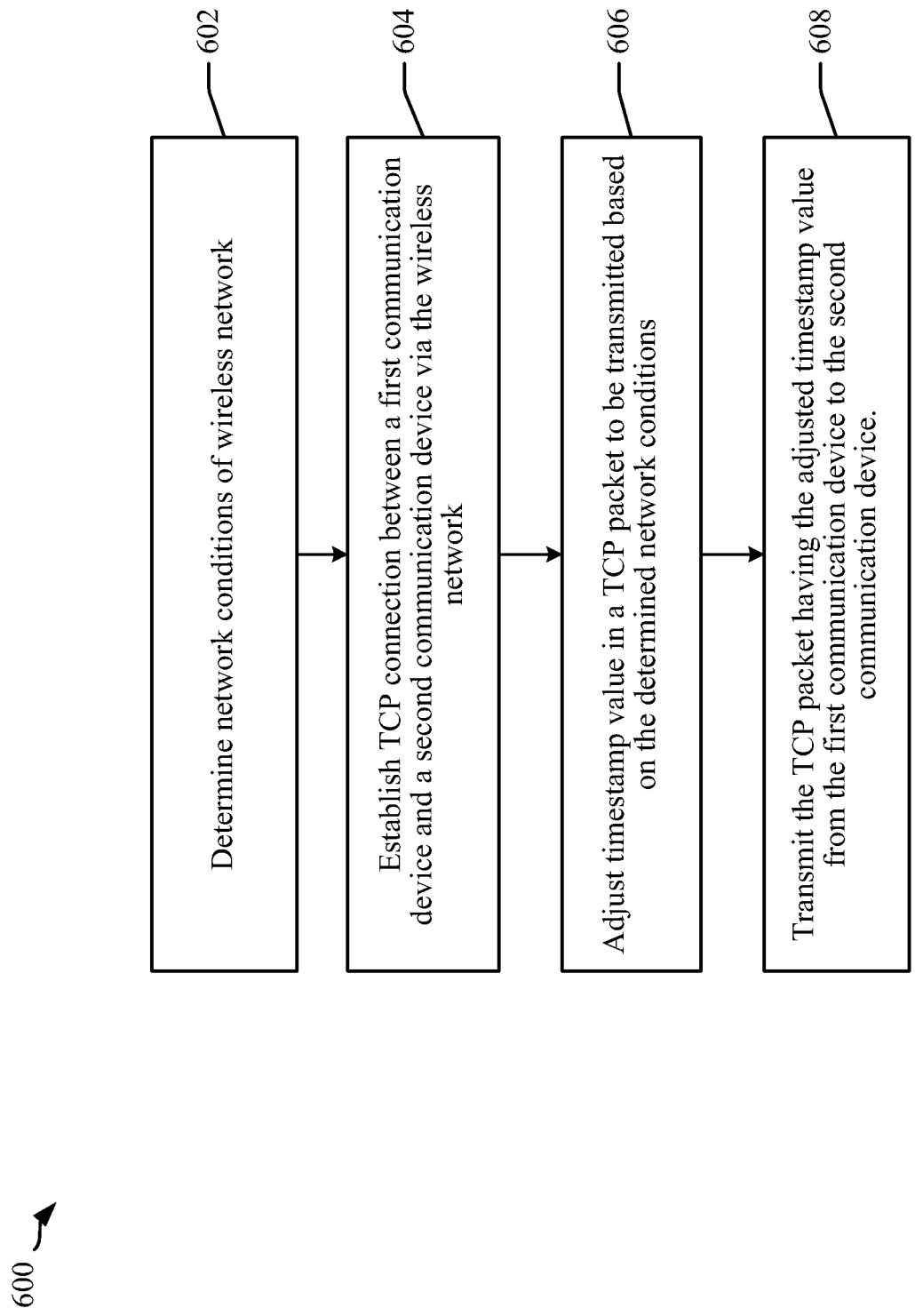
FIG. 6 is a flowchart illustrating certain aspects of a methodology disclosed herein for rewriting or adjusting timestamp values in TCP packets.

FIG. 6 is a flowchart illustrating certain aspects of a method 600 disclosed herein for wireless network communication that includes rewriting or adjusting timestamp values in TCP packets. The method 600 includes determining network conditions of at least a wireless network as shown in block 602. In an aspect, the processes of block 602 may be implemented by a wireless modem, such as modem 404 in FIG. 4, or another dedicated processing circuitry (not shown), or equivalents thereof. Moreover, the processes of block 602 may include the use of lower layers, such as an LTE/W layer, to determine network conditions and a time adjustment value or parameter.

Method 600 further includes establishing or initiating a transmission control protocol (TCP) connection between a first communication device, such as device 106, and a second communication device (e.g., 114) via at least the wireless network (e.g., base stations 102 and core network 108) as shown at block 604. The processes of block 604, according to certain aspects, may be effectuated using a modem (e.g., modem 404 or 506), and also may include the use of processing circuitry and applications running thereon (e.g., 406, 410, or 502), or equivalents thereof.

After establishment or initiation of the TCP connection, method 600 further includes adjusting or rewriting a timestamp value in a TCP packet to be transmitted based at least in part on the determined network conditions as shown in block 606. As described herein, the process of timestamp adjustment or rewriting may be accomplished through a dedicated hardware, such as time adjusting hardware 412 or 504 or equivalent logic or circuitry. Once the timestamp is adjusted or rewritten, the TCP packet having the adjusted timestamp value is transmitted from the first communication device to the second communication device as illustrated in block 608.

According to further aspects, method 600 includes determining network conditions that affect TCP message transmission round trip timing (RTT), as was discussed earlier. In yet further aspects, method 600 features that the TCP packet may be one or more of a TCP SYN, TCP SYN+ACK, and TCP ACK packet.

Method 600 may further include passing a timestamp adjustment parameter calculated based on the determined network conditions from a modem to a timestamp adjusting circuitry in the first communication device, such as hardware circuitry 412 or 504, as examples, or equivalents thereof. Moreover, method 600 may include adjusting the timestamp in the TCP packet with the timestamp adjusting circuitry based on the timestamp adjustment parameter.

According to further aspects, method 600 includes determining with the timestamp adjusting circuitry whether a TCP packet to be transmitted is a particular type of TCP packet, and adjusting the timestamp in TCP packets with the timestamp adjusting circuitry determined to be of the particular type of TCP packet, such as the particular type of TCP packet is a TCP packet having a timestamp header. This functionality may be implemented with filtering circuitry 416, as an example, or equivalents thereof. The method 600 also includes recalculating a checksum in the TCP packet with the timestamp adjusting circuitry based on the adjustment to the timestamp, as well as resetting the timestamp adjustment parameter to a default value after closing of a TCP session between the first communication device and the second communication device.

Figure 7:
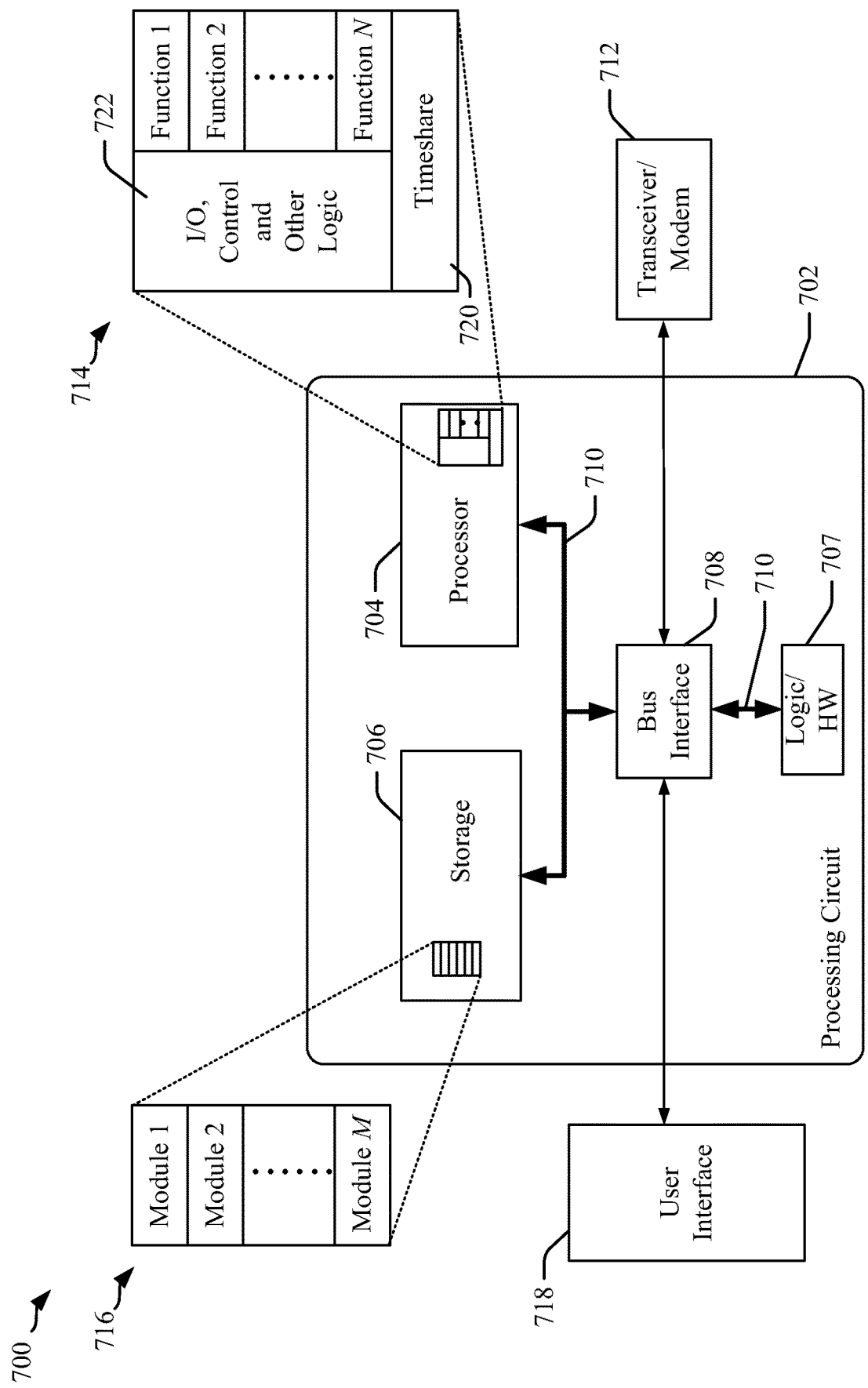
FIG. 7 is a block diagram illustrating an example of an apparatus employing a processing circuit that may be adapted according to certain aspects disclosed herein.

FIG. 7 is a block diagram illustrating an example of an apparatus employing a processing circuit that may be adapted according to certain aspects disclosed herein. In accordance with various aspects of the disclosure, an element, or any portion of an element, or any combination of elements as disclosed herein may be implemented using the processing circuit 702. The processing circuit 702 may include one or more processors 704 that are controlled by some combination of hardware and software modules. Examples of processors 704 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 704 may include specialized processors that perform specific functions, and that may be configured, augmented or controlled by one of the software modules 716. The one or more processors 704 may be configured through a combination of software modules 716 loaded during initialization, and further configured by loading or unloading one or more software modules 716 during operation.

In the illustrated example, the processing circuit 702 may be implemented with a bus architecture, represented generally by the bus 710. The bus 710 may include any number of interconnecting buses and bridges depending on the specific application of the processing circuit 702 and the overall design constraints. The bus 710 links together various circuits including the one or more processors 704, storage 706, and logic or hardware 707. Storage 706 may include memory devices and mass storage devices, and may be referred to herein as computer-readable media and/or processor-readable media. The bus 710 may also link various other circuits such as timing sources, timers, peripherals, voltage regulators, and power management circuits. A bus interface 708 may provide an interface between the bus 710 and one or more transceivers or wireless modems 712. A transceiver 712 may be provided for each networking technology supported by the processing circuit. In some instances, multiple networking technologies may share some or all of the circuitry or processing modules found in a transceiver 712. Each transceiver 712 provides a means for communicating with various other apparatus over a transmission medium. Depending upon the nature of the apparatus, a user interface 718 (e.g., keypad, display, speaker, microphone, joystick) may also be provided, and may be communicatively coupled to the bus 710 directly or through the bus interface 708.

A processor 704 may be responsible for managing the bus 710 and for general processing that may include the execution of software stored in a computer-readable medium that may include the storage 706. In this respect, the processing circuit 702, including the processor 704, may be used to implement any of the methods, functions and techniques disclosed herein. The storage 706 may be used for storing data that is manipulated by the processor 704 when executing software, and the software may be configured to implement any one of the methods disclosed herein.

One or more processors 704 in the processing circuit 702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 706 or in an external computer readable medium. The external computer-readable medium and/or storage 706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The computer-readable medium and/or storage 706 may also include, by way of example, a carrier wave, a transmission line, and any other suitable medium for transmitting software and/or instructions that may be accessed and read by a computer. Computer-readable medium and/or the storage 706 may reside in the processing circuit 702, in the processor 704, external to the processing circuit 702, or be distributed across multiple entities including the processing circuit 702. The computer-readable medium and/or storage 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 706 may maintain software maintained and/or organized in loadable code segments, modules, applications, programs, etc., which may be referred to herein as software modules 716. Each of the software modules 716 may include instructions and data that, when installed or loaded on the processing circuit 702 and executed by the one or more processors 704, contribute to a run-time image 714 that controls the operation of the one or more processors 704. When executed, certain instructions may cause the processing circuit 702 to perform functions in accordance with certain methods, algorithms and processes described herein.

Some of the software modules 716 may be loaded during initialization of the processing circuit 702, and these software modules 716 may configure the processing circuit 702 to enable performance of the various functions disclosed herein. For example, some software modules 716 may configure internal devices and/or logic circuits 722 of the processor 704, and may manage access to external devices such as the transceiver 712, the bus interface 708, the user interface 718, timers, mathematical coprocessors, and so on. The software modules 716 may include a control program and/or an operating system that interacts with interrupt handlers and device drivers, and that controls access to various resources provided by the processing circuit 702. The resources may include memory, processing time, access to the transceiver 712, the user interface 718, and so on.

One or more processors 704 of the processing circuit 702 may be multifunctional, whereby some of the software modules 716 are loaded and configured to perform different functions or different instances of the same function. The one or more processors 704 may additionally be adapted to manage background tasks initiated in response to inputs from the user interface 718, the transceiver 712, and device drivers, for example. To support the performance of multiple functions, the one or more processors 704 may be configured to provide a multitasking environment, whereby each of a plurality of functions is implemented as a set of tasks serviced by the one or more processors 704 as needed or desired. In one example, the multitasking environment may be implemented using a timesharing program 720 that passes control of a processor 704 between different tasks, whereby each task returns control of the one or more processors 704 to the timesharing program 720 upon completion of any outstanding operations and/or in response to an input such as an interrupt. When a task has control of the one or more processors 704, the processing circuit is effectively specialized for the purposes addressed by the function associated with the controlling task. The timesharing program 720 may include an operating system, a main loop that transfers control on a round-robin basis, a function that allocates control of the one or more processors 704 in accordance with a prioritization of the functions, and/or an interrupt driven main loop that responds to external events by providing control of the one or more processors 704 to a handling function.

Figure 8:
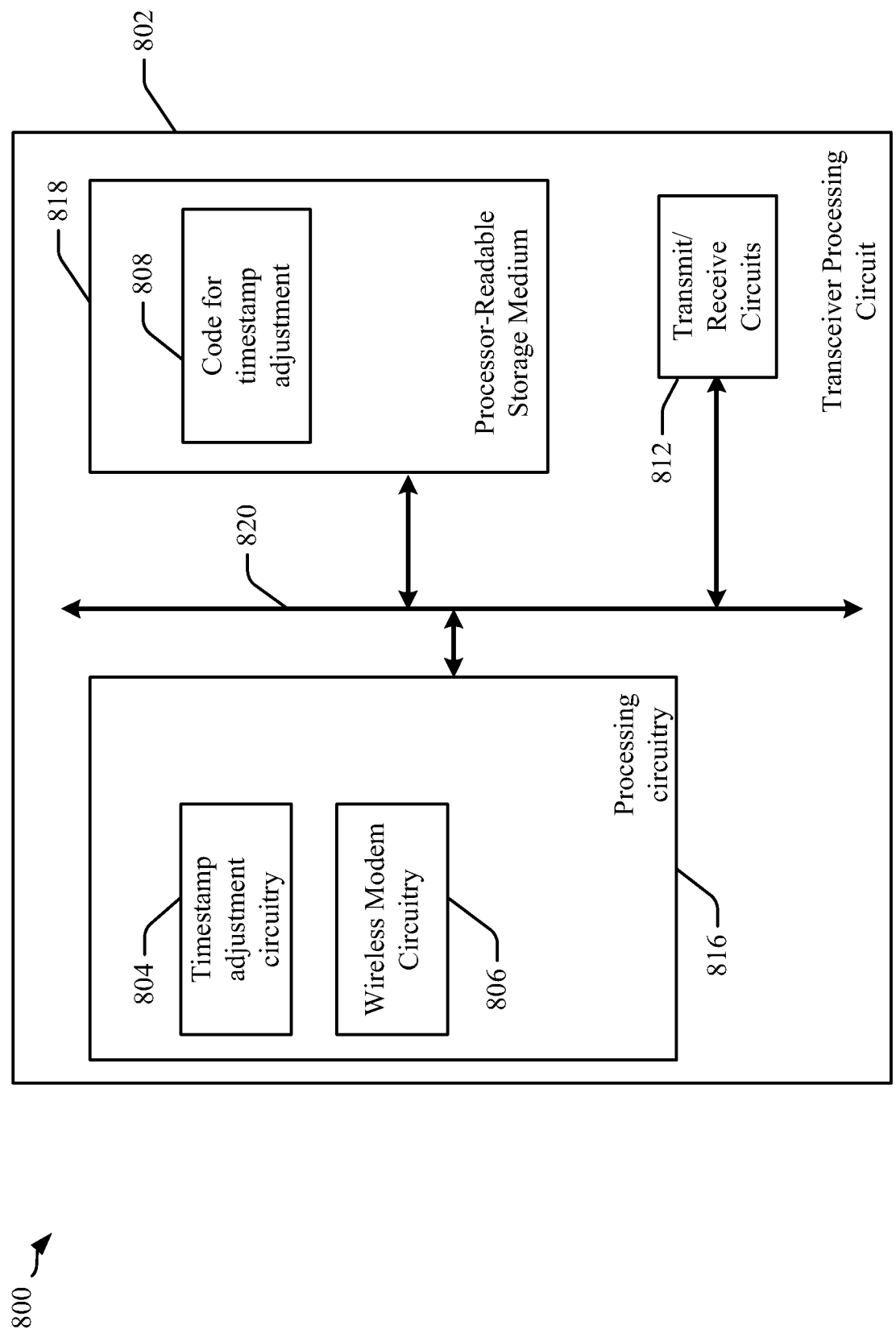
FIG. 8 illustrates a hardware implementation for an apparatus adapted to perform timestamp adjustment in accordance with certain aspects disclosed herein.

FIG. 8 is a diagram illustrating an example of a hardware implementation for an apparatus 800 employing a processing circuit 802. In the illustrated example, processing circuit 802 may be implemented within a wireless communication device. The processing circuit 802 typically contains a processor or processing circuitry 816 that may include one or more of a microprocessor, microcontroller, digital signal processor, a sequencer and a state machine. The processing circuit 802 may be implemented with a bus architecture, represented generally by the bus 820. The bus 820 may include any number of interconnecting buses and bridges depending on the specific application of the processing circuit 802 and the overall design constraints. The bus 820 links together various circuits including one or more processors and/or hardware modules, represented by the processor 816, specific modules or circuits such as calibration pattern determination module 804, transmitter/line interface circuits 812 that send signaling over the various lines, connectors, or wires 814, and computer-readable storage medium 818. The bus 820 may also link various other circuits such as timing sources, peripherals, voltage regulators, and power management circuits, which are well known in the art, and therefore, will not be described any further.

The processor 816 is responsible for general processing, including the execution of software stored on the computer-readable storage medium 818. The software, when executed by the processor 816, causes the processing circuit 802 to perform the various functions described before for any particular apparatus. The computer-readable storage medium 818 may also be used for storing data that is manipulated by the processor 816 when executing software, including data encoding for symbols transmitted over the connectors or wires 814, which may be configured as data lanes. The processing circuit 802 further includes at least module 804, discussed above. The modules including module 804 may be software modules running in the processor 816, resident/stored in the computer-readable storage medium 818, one or more hardware modules coupled to the processor 816, or some combination thereof. The modules including module 804 may include microcontroller instructions, state machine configuration parameters, or some combination thereof.

In one configuration, the apparatus 800 may be configured for data communication over a wireless network, such as that shown in FIG. 1. The apparatus 800 may include module and/or circuit 804 that is configured to generate a timestamp adjustment for a TCP packet as discussed above. Additionally, the apparatus 800 may include wireless modem circuitry 806 for transmitting and receiving, among other things, TCP packets over a wireless network, as discussed before. Additionally, processor-readable storage medium 818 may include code 808 that is configured for causing the processing circuitry 816 to perform timestamp adjustment or rewriting.

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for." Moreover, the term "or" is intended to mean an inclusive "or" rather than an exclusive "or." That is, unless specified otherwise, or clear from the context, the phrase "X employs A or B" is intended to mean any of the natural inclusive permutations, such as the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless network communication comprising:
   determining network conditions of at least a wireless network;
   establishing a transmission control protocol (TCP) connection between a first communication device and a second communication device via at least the wireless network;
   adjusting a timestamp value in a TCP packet to be transmitted using a timestamp adjusting circuitry, the adjusting based at least in part on the determined network conditions;
   passing a timestamp adjustment parameter calculated based on the determined network conditions from a modem to the timestamp adjusting circuitry in the first communication device; and
   adjusting the timestamp in the TCP packet with the timestamp adjusting circuitry based on the timestamp adjustment parameter.

2. The method of claim 1, further comprising:
   determining with the timestamp adjusting circuitry whether a TCP packet to be transmitted is a particular type of TCP packet; and
   adjusting the timestamp in TCP packets with the timestamp adjusting circuitry determined to be of the particular type of TCP packet.

3. The method of claim 2, wherein the particular type of TCP packet is a TCP packet having a timestamp header.

4. The method of claim 1, further comprising recalculating a checksum in the TCP packet with the timestamp adjusting circuitry based on the adjustment to the timestamp.

5. The method of claim 1, further comprising:
resetting the timestamp adjustment parameter to a default value after closing of a TCP session between the first communication device and the second communication device.

6. The method of claim 1, further comprising:
transmitting the TCP packet having the adjusted timestamp value from the first communication device to the second communication device.

7. The method of claim 1, wherein determining the network conditions includes determining network conditions that affect TCP message transmission round trip timing (RTT).

8. The method of claim 1, wherein the TCP packet is one or more of a TCP SYN, TCP SYN+ACK, and TCP ACK packet.

9. An apparatus for wireless communication comprising:
means for determining network conditions of at least a wireless network;
means for establishing a transmission control protocol (TCP) connection between a first communication device and a second communication device via at least the wireless network; and
means for adjusting a timestamp value in a TCP packet transmitted based at least in part on the determined network conditions, the means for adjusting the timestamp value including a timestamp adjusting circuitry;
wherein the means for timestamp adjustment is configured to:
receive a timestamp adjustment parameter from a modem in the first communication device that calculates the timestamp adjustment parameter based on the determined network conditions; and
adjust the timestamp in the TCP packet based on the timestamp adjustment parameter.

10. The apparatus of claim 9, wherein the means for timestamp adjustment further comprises:
means for determining whether a TCP packet to be transmitted is a TCP packet having a timestamp header; and
adjusting the timestamp in TCP packets with the timestamp adjusting circuitry determined to have a timestamp header.

11. The apparatus of claim 9, wherein the means for timestamp adjustment further comprises:
means for recalculating a checksum in the TCP packet with the timestamp adjusting circuitry based on the adjustment to the timestamp.

12. The apparatus of claim 9, further comprising:
means for resetting the timestamp adjustment parameter to a default value after closing of a TCP session between the first communication device and the second communication device.

13. The apparatus of claim 9, further comprising:
means for transmitting the TCP packet having the adjusted timestamp value from the first communication device to the second communication device.

14. The apparatus of claim 9, wherein determining the network conditions includes determining network conditions that affect TCP message transmission round trip timing (RTT).

15. The apparatus of claim 9, wherein the TCP packet is one or more of a TCP SYN, TCP SYN+ACK, and TCP ACK packet.

16. An apparatus for wireless communication in a wireless communication device, the apparatus comprising:
a processing circuitry;
memory in communication with the processor; and
instructions stored in the memory and operable, when executed by the processing circuitry, to cause the apparatus to:
determine network conditions of at least a wireless network;
establish a transmission control protocol (TCP) connection between the communication device and another communication device via at least the wireless network;
adjust a timestamp value using a timestamp adjusting circuitry in a TCP packet to be transmitted based at least in part on the determined network conditions;
pass a timestamp adjustment parameter calculated based on the determined network conditions from a modem to a timestamp adjusting circuitry in the first communication device; and
adjust the timestamp in the TCP packet with the timestamp adjusting circuitry based on the timestamp adjustment parameter.

17. The apparatus of claim 16, further comprising instructions stored in the memory and operable, when executed by the processing circuitry, to cause the apparatus to:
determine with the timestamp adjusting circuitry whether a TCP packet to be transmitted is a particular type of TCP packet; and
adjust the timestamp in TCP packets with the timestamp adjusting circuitry determined to be of the particular type of TCP packet.

18. The apparatus of claim 17, wherein the particular type of TCP packet is a TCP packet having a timestamp header.

19. The apparatus of claim 17, further comprising instructions stored in the memory and operable, when executed by the processing circuitry, to cause the apparatus to recalculate a checksum in the TCP packet with the timestamp adjusting circuitry based on the adjustment to the timestamp.

20. The apparatus of claim 17, further comprising instructions stored in the memory and operable, when executed by the processing circuitry, to cause the apparatus to reset the timestamp adjustment parameter to a default value after closing of a TCP session between the first communication device and the second communication device.

21. The apparatus of claim 16, further comprising instructions stored in the memory and operable, when executed by the processing circuitry, to cause the apparatus to transmit the TCP packet having the adjusted timestamp value from the first communication device to the second communication device.

22. The apparatus of claim 16, wherein determining the network conditions includes determining network conditions that affect TCP message transmission round trip timing (RTT).

23. The apparatus of claim 16, wherein the TCP packet is one or more of a TCP SYN, TCP SYN+ACK, and TCP ACK packet.

24. A non-transitory computer-readable medium storing computer-executable code, comprising code for causing a computer to:
determine network conditions of at least a wireless network;
establish a transmission control protocol (TCP) connection between a first communication device and a second communication device via at least the wireless network;
adjust a timestamp value in a TCP packet to be transmitted based at least in part on the determined network conditions;

pass a timestamp adjustment parameter calculated based on the determined network conditions from a modem to a timestamp adjusting circuitry in the first communication device; and adjust the timestamp in the TCP packet with the timestamp adjusting circuitry based on the timestamp adjustment parameter.

25. The non-transitory computer-readable medium of claim 24, further comprising code for causing a computer to:

transmit the TCP packet having the adjusted timestamp value from the first communication device to the second communication device.

26. The non-transitory computer-readable medium of claim 24, wherein determining the network conditions includes determining network conditions that affect TCP message transmission round trip timing (RTT).

27. The non-transitory computer-readable medium of claim 24, wherein the TCP packet is one or more of a TCP SYN, TCP SYN+ACK, and TCP ACK packet.

\* \* \* \* \*